March 3, 1942. B. V. MITCHELL 2,275,228
ELECTRIC HEATING ELEMENT
Filed June 26, 1941

Byron V. Mitchell
INVENTOR.
BY Church & Church
HIS ATTORNEYS

Patented Mar. 3, 1942

2,275,228

UNITED STATES PATENT OFFICE 2,275,228

ELECTRIC HEATING ELEMENT

Byron V. Mitchell, Jamaica, N. Y.

Application June 26, 1941, Serial No. 399,903

4 Claims. (Cl. 219—46)

This invention relates to improvements in electrical heating apparatus.

In the use of heating apparatus in connection with substances, such as sheets of cellulose acetate, which are quite sensitive in the sense that they are very susceptible to overheating, it is important to maintain a very accurate control of the heat applied thereto. For instance, in attaching closures of cellulose acetate to eye openings of gas masks with rubber seams, as disclosed in my pending application Serial No. 370,221, extreme care must be exercised in heating the rubber to cure it or, otherwise, the closure will become soft or char and its transparency be seriously affected. The primary object of the present invention is to provide an electrical heating member with which very accurate control can be maintained over the heat generated therein.

Another object is to provide a body heating material that can be produced in continuous lengths, but which can also be readily severed to form one or more heating members each of any desired length containing any number of well defined areas each of a predetermined heat generating capacity.

With these and other objects in view, the invention consists in certain details of construction and combinations and arrangements of parts, all as will hereinafter be more fully described and the novel features thereof particularly pointed out in the appended claims.

In the accompanying drawing—

Figure 1:
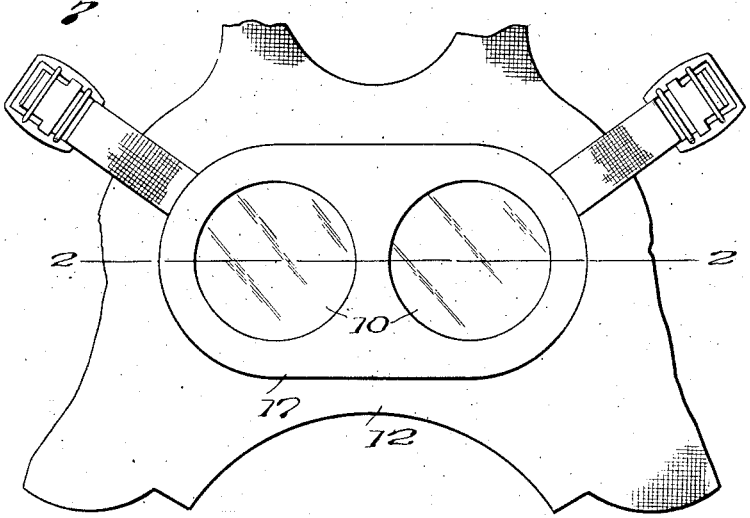
Figure 1 is a fragmentary plan view of a blank such as used for making gas masks.
Figure 2:
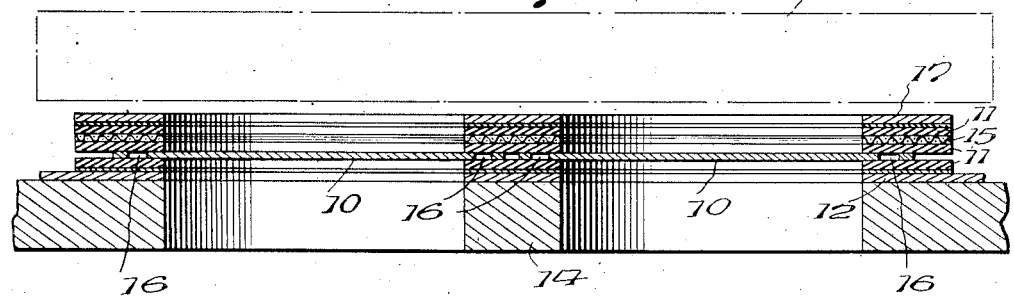
Fig. 2 is a sectional view on the line 2—2 of Fig. 1, illustrating the mask in the clamp used in vulcanizing the rubber seam around the eye openings.

While the present heating member is not limited to use in the specific circumstances described, nevertheless it has been designed especially for use in securing the closures 10 of cellulose acetate for the eye openings of gas masks by cementing said closures around the openings with rubber or a rubber substitute cured in situ to form a gas-tight seam. For instance, the closures 10 are coated on opposite sides at their edges with uncured rubber 11 and placed on the blank 12 between pressure plates 13, 14. The heating member of the present invention, indicated at 15, is embedded in one of the layers of rubber and, upon application of proper heat by the passage of current through the heat member and application of pressure, the rubber is cured. Perforations 16 in the eye pieces become filled with rubber as the latter becomes fluid during the curing operation, so that the eye pieces are securely attached to the blank with gas-tight seams. Also, if desired, a fabric facing 17 can be placed over the last layer of rubber.

Figure 3:
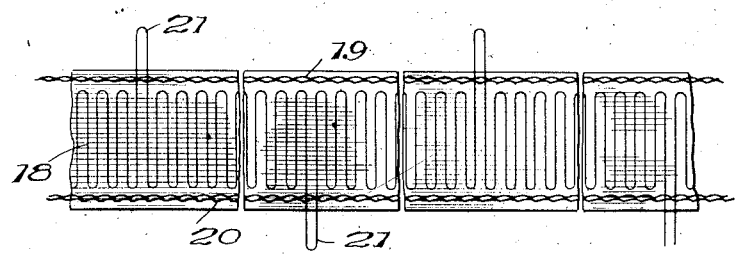
Fig. 3 is a fragmentary plan view of the heating member.

As previously stated, in the use of heat sensitive materials, such as cellulose acetate which becomes rather soft and chars when subjected to temperatures upwards of 150° F., it is quite important to maintain a rather accurate control of the heat applied or utilized in curing rubber or rubber substitute used in joints or seams as described above. For this reason, the present heating member is composed of a series of individual areas each possessing a predetermined heat generating capacity. As shown more particularly in Fig. 3, this heating element is made in the form of a continuous tape-like body having a metallic filament 18 therein which serves as the actual heating element, said filament contacting lead wires 19, 20 of opposite polarity at points spaced longitudinally of the tape. The length of heater filament 18 between each two successive points of contact with the leads 19, 20 is such that a predetermined degree of heat will be generated over each individual area for a given current passed through the leads. Preferably, the matallic filament 18 constitutes the weft of the woven tape, being woven into the tape in such manner that a predetermined length of the filament is contained in each linear unit of the tape, and, at the extremities of each of these linear units or areas, this weft filament crosses and contacts the leads 19, 20. The leads 19, 20 can be run lengthwise in the selvage at opposite sides of the tape and certain loops of the filament 18 can be extended to pass between loops in the respective leads. Such extended loops of filament 18 are indicated at 21. With a heating member made in this fashion, the heat generated over an extended area can be accurately controlled. For instance, assuming that 100 inches of a certain gauge wire to be used as filament 18, when energized for 15 minutes with 110 volts will develop a temperature of approximately 300° F. when placed in confinement and, if left connected longer than 15 minutes, will not materially exceed that temperature or will not exceed that temperature by more than a few degrees Fahrenheit, an excess which, in comparison to 300° F., would be negligible and represents a reasonably accurate heat control. On this assumption, by weaving the filament 18 into a tape with 25 one-inch crossings of the filament to each linear inch of tape, every four-inch length of tape would constitute a heating unit capable of generating a temperature of approximately 300° F. under the conditions above set forth. In such a tape, the loops 21 would be produced every four inches in filament 18, alternately, at opposite sides of the tape. In actual practice, I have found that, with the present heating member used in the method of curing rubber seams above described, the heat developed thereby, when the assembled layers of rubber and other materials are clamped between the pressure plates 13, 14, will not detrimentally affect such heat-sensitive materials as cellulose acetate.

It will be understood that the tape-like body can be produced in continuous lengths, the heating filament extending continuously lengthwise thereof and sections of suitable length can be cut from the tape, depending upon the area to be heat-treated.

This application is a continuation in part of application Serial No. 370,221.

It might be added that it is obvious the warp members of tape-like body should be of a material which is a non-conductor of electricity so as to confine the flow of current, and, consequently, the generation of heat to predetermined lengths of heating filament.

What I claim is:

1. An electrical heating member of woven tape-like formation, the weft of said woven body being formed of a metallic filament, and electrical conductors woven in the selvage at opposite sides of the tape lengthwise of said tape, said metallic filament contacting said conductors at predetermined points spaced lengthwise of the tape with equal lengths of filament disposed between each two successive points of contact.

2. An electrical heating member of woven tape-like formation having electrical leads of opposite polarity extending along its opposite side edges and having a metallic filamentary weft element traversing and contacting said leads alternately at points spaced longitudinally of the tape with equal lengths of said weft element between each two successive points of contact.

3. An electrical heating member of tape-like formation having electrical leads woven therein longitudinally thereof, and a continuous filamentary metallic filament carried by said tape, said filament being disposed back and forth across the tape and contacting said leads alternately at points spaced longitudinally of the tape with predetermined lengths of filament between each two successive points of contact.

4. An electrical heating member of continuous tape-like formation having electrical leads of opposite polarity woven therein and a continuous metallic filament contacting said leads alternately at points spaced longitudinally of said tape, there being a predetermined length of said filament between each two successive points of contact with said leads forming a continuous series of individual heating areas each of predetermined heating value.

BYRON V. MITCHELL.